US007138057B2

United States Patent
Debes et al.

(10) Patent No.: US 7,138,057 B2
(45) Date of Patent: Nov. 21, 2006

(54) FILTER MEDIA

(75) Inventors: Michael H. Debes, West Grove, PA (US); Richard E. Gebert, Elkton, MD (US)

(73) Assignee: Gore Enterprise Holdings, Inc., Newark, DE (US)

(*) Notice: Subject to any disclaimer, the term of this patent is extended or adjusted under 35 U.S.C. 154(b) by 0 days.

(21) Appl. No.: 10/896,770

(22) Filed: Jul. 22, 2004

(65) Prior Publication Data

US 2006/0016749 A1 Jan. 26, 2006

(51) Int. Cl.
- *B01D 39/00* (2006.01)
- *B01D 59/50* (2006.01)
- *C08J 5/00* (2006.01)

(52) U.S. Cl. ............ 210/500.36; 210/490; 210/500.29; 210/508; 55/486; 156/308.28

(58) Field of Classification Search ............... 210/490, 210/484, 488, 500.36, 506, 508, 500.29; 156/60, 297, 307.7, 308.2, 321; 428/153, 428/537.5; 162/164.5, 164.6, 164.7, 165, 162/84; 55/486, 587, 382
See application file for complete search history.

(56) References Cited

U.S. PATENT DOCUMENTS

| | | | |
|---|---|---|---|
| 3,953,566 A | 4/1976 | Gore | 264/288 |
| 3,962,153 A | 6/1976 | Gore | 260/2.5 |
| 4,096,227 A | 6/1978 | Gore | 264/210 |
| 4,187,390 A | 2/1980 | Gore | 174/102 |
| 5,207,812 A | 5/1993 | Tronto et al. | 55/498 |
| 5,595,630 A * | 1/1997 | Moffett | 162/164.1 |
| 5,830,548 A * | 11/1998 | Andersen et al. | 428/36.4 |
| 5,891,614 A * | 4/1999 | Ohzeki | 430/569 |
| 6,171,369 B1 * | 1/2001 | Schultink et al. | 95/57 |
| 6,334,881 B1 * | 1/2002 | Giannetta et al. | 55/486 |
| 6,340,411 B1 * | 1/2002 | Hansen et al. | 162/173 |
| 6,390,305 B1 * | 5/2002 | Rabasco et al. | 210/504 |
| 6,589,720 B1 * | 7/2003 | Bourdelais et al. | 430/432 |
| 6,662,786 B1 * | 12/2003 | Watanabe | 123/516 |
| 6,872,233 B1 * | 3/2005 | Smithies et al. | 55/486 |
| 2002/0083690 A1 | 7/2002 | Dietmar et al. | 55/382 |
| 2003/0140606 A1 | 7/2003 | Smithies | 55/382 |
| 2003/0194547 A1 | 10/2003 | Fuhrmann et al. | 428/304.4 |

* cited by examiner

*Primary Examiner*—Ana Fortuna
(74) *Attorney, Agent, or Firm*—Richard W. Ellis

(57) ABSTRACT

In one aspect, the invention provides an article consisting essentially of a paper layer including about 10 Wt % to about 40 Wt % of a thermoplastic polymer and an ePTFE membrane laminated to the paper layer. Preferably, the paper layer includes about 10 Wt % to about 30 Wt % of a thermoplastic polymer. More preferably, the paper layer includes about 18 Wt % to about 25 Wt % of a thermoplastic polymer. A paper layer including about 20 Wt % of a thermoplastic polymer is most preferred. In another aspect, the thermoplastic polymer may comprise poly vinyl acetate. In yet another aspect, the invention provides a filter media consisting essentially of a cellulose paper layer including about 20 Wt % poly vinyl acetate binder; and an ePTFE membrane laminated to said cellulose paper layer. In still another aspect, the invention provides a paper layer in which the paper is cellulose paper. In yet another aspect, the invention provides a method of making a filter media consisting essentially of: providing a cellulose paper layer including about 20 Wt % of poly vinyl acetate, providing an ePTFE membrane to at least one surface of the cellulose paper layer; and laminating the ePTFE membrane to the cellulose paper layer.

6 Claims, 3 Drawing Sheets

FILTER MEDIA

BACKGROUND OF THE INVENTION

Figure 1:
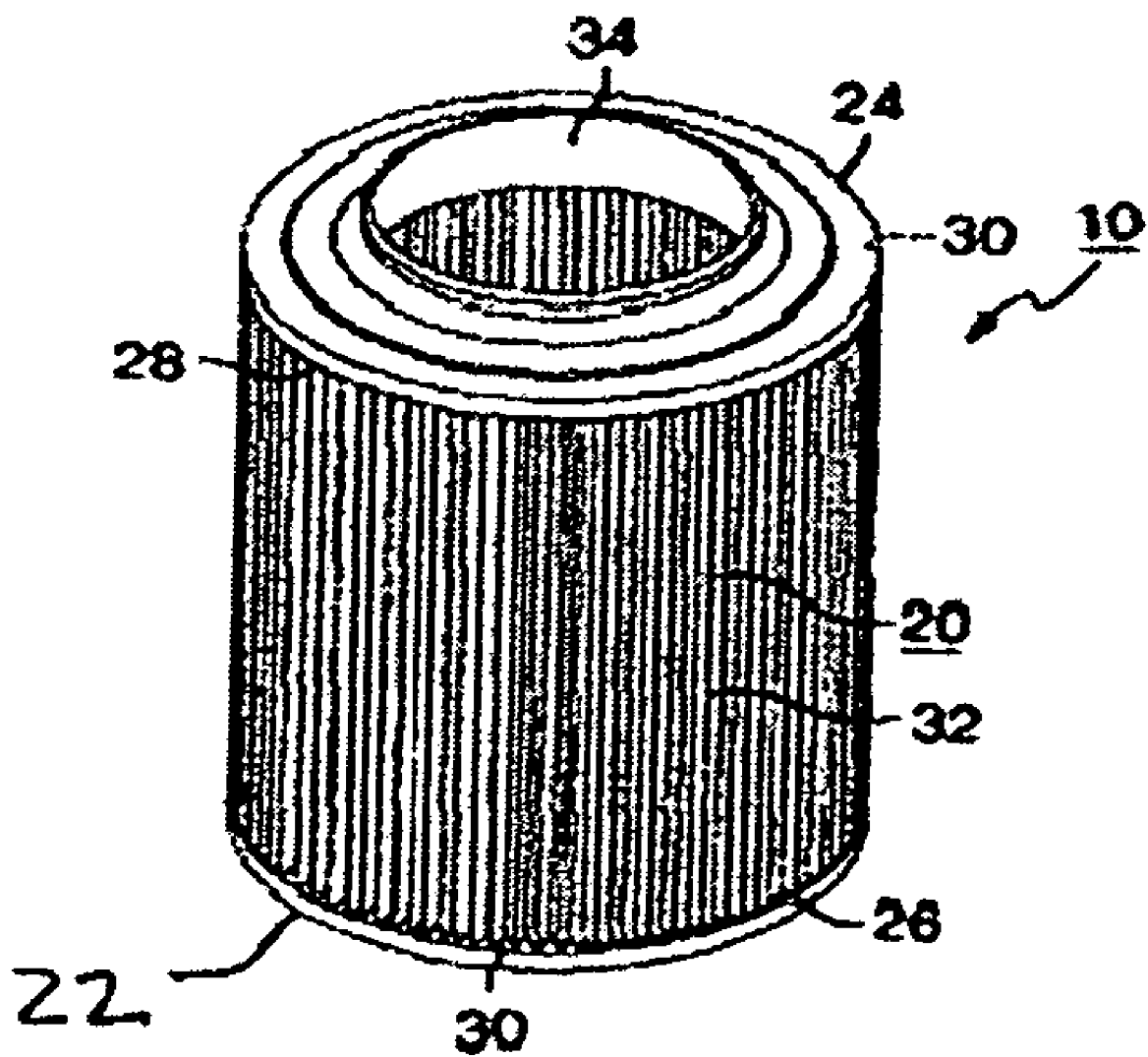

The removal of particulates from a gas stream has long been a practice in a variety of industrial fields. Conventional means for filtering particulates and the like from gas streams include, but are not limited to, filter bags, filter tubes and filter cartridges. For convenience herein, the term "filter element" will be used to refer collectively to these types of filtration means.

Filter elements are typically constructed from felts and/or fabrics made from a variety of materials, including polyesters, polypropylenes, aramids, glasses, cellulose and fluoropolymers. Selection of the type of material used is typically based on the gas stream with which the filter element comes in contact, the operating conditions of the system, the type of particulate being filtered and cost.

Depth filtration techniques utilize the filter element to stop particles through the depth of the element. As the particles build up on the element, the filtration efficiency of the element is increased. After an amount of dust has caked on the filter element, the flow rate of gas through the element is reduced to a level where the filter must be replaced or the bulk dust cake removed from the surface of the element. Typically the dust cake is removed by some form of agitation, such as a pulse of compressed air, vibration, shaking or the like.

Nonwoven cellulose paper filters comprise loosely assembled webs or masses of fibers bound together with an adhesive binder. Adequately bonded cellulose paper filters have advantages over other non-woven media and woven fabrics for a large variety of uses. A significant advantage of non-woven cellulose paper media is lower cost. The cost effectiveness makes cellulose paper filter media particularly attractive in consumer products, such as filters for household vacuums. Many such vacuums use low cost filter media comprising cellulose paper. The nonwoven cellulose paper filter may be in the form of a pleated cartridge or a bag.

It is known to form cellulose paper filters by impregnating, printing or otherwise depositing an adhesive bonding composition on a base web of cellulose fibers. The base web of cellulose fibers to which the binder is applied can be produced by carding, garnetting, air-laying, wet-laying or other known operations.

Cellulose paper has traditionally been used as a single ply in which it provides dust filtration and containment, as well as the strength and abrasion resistance required of a vacuum cleaner bag or filter cartridge. This material is rigid enough to enable easy fabrication on standard bag manufacturing or pleating equipment. The paper is predominantly composed of wood pulp, but may have some synthetic fiber reinforcement.

One popular adhesive binder composition for cellulose paper filter products is a poly vinyl acetate. However, other thermoplastic polymers are also commonly used as binders in the manufacture of cellulose paper filters.

The standard cellulose paper filter media typically has a basis weight of about 30–200 g/m$^2$ and commonly about 100 g/m$^2$. This media may have an air permeability in the range of about 20–200 Frazier. These filters do not have the filtration efficiency of higher performance media, such as membrane media. The open structure of cellulose media results in rapid clogging with dust. Moreover, the dust holding capacity is limited by the media thickness. In certain applications, only thin filter media can be used.

A significant development in the area of particle filtration was achieved when expanded PTFE membrane was incorporated as a surface laminate on synthetic depth filter elements. One example is taught in U.S. Pat. No. 5,207,812, directed to a filter cartridge for removing particles of dust from a stream of moving gas or air. Preferred filter media for the cartridge are spun bond or non woven composites containing a layer of porous expanded polytetrafluoroethylene membrane. In household vacuums, filter elements constructed of an ePTFE membrane laminated under heat and pressure to a polyester support are commercially available.

Use of expanded PTFE membranes greatly enhanced the performance of such filter elements because the particles collected on the surface of the expanded PTFE, rather than in the depth of the element, as was occurring in the absence of the expanded PTFE layer. Several significant advantages were observed with these filter elements; first, the filtration efficiency of the elements was high immediately from the outset of the filtration process, and it was not necessary to "build up" a cake of particles to achieve high efficiency; second, the elements lasted longer because particles were not getting into the backing fabric of the element and clogging the element; and third, the cleaning energy needed to clean the dust cake off of the elements was lower because dust cake adhesion to the membrane surface is lower.

The membrane is typically laminated directly to a non-woven thermoplastic polymer backer under heat and pressure. Known means for adhering the membrane filter media to other support structures include adhering by the use of a separate adhesive. Suitable adhesives may include hot melt polyimides, polyamides, silicones, polyesters, epoxies, polyurethanes, and the like.

Filter media manufactured in accordance with the procedures described above is effective, but relatively expensive. Materials such as meltblown or spun bond polyester are known to be suitable for welding or fusing to ePTFE membranes, but are costly. Such materials may amount to more than 25% of the finished filter media cost. Using a separate adhesive also adds process complexity and cost.

What is needed is a filter media that combines membrane filtration media performance with low cost cellulose paper media without the use of a separate adhesive.

SUMMARY

In one aspect, the invention provides an article consisting essentially of a paper layer including about 10 Wt % to about 40 Wt % of a thermoplastic polymer and an ePTFE membrane laminated to the paper layer. Preferably, the paper layer includes about 10 Wt % to about 30 Wt % of a thermoplastic polymer. More preferably, the paper layer includes about 18 Wt % to about 25 Wt % of a thermoplastic polymer. A paper layer including about 20 Wt % of a thermoplastic polymer is most preferred.

In another aspect, the thermoplastic polymer may comprise poly vinyl acetate.

In yet another aspect, the invention provides a filter media consisting essentially of a cellulose paper layer including about 20 Wt % poly vinyl acetate binder; and an ePTFE membrane laminated to said cellulose paper layer.

In still another aspect, the invention provides a paper layer in which the paper is cellulose paper.

In yet another aspect, the invention provides a method of making a filter media consisting essentially of: providing a cellulose paper layer including about 20 Wt % of poly vinyl acetate, providing an ePTFE membrane to at least one surface of the cellulose paper layer; and laminating the ePTFE membrane to the cellulose paper layer.

DESCRIPTION

The present invention relates to improved filtration media. The invention provides a durable and renewable filter element having a membrane filtration media laminated to a cellulose paper support without the use of an adhesive layer. Preferred membrane filtration media is hydrophobic material that provides a barrier to liquid penetration. A particularly preferred membrane filtration media is ePTFE.

FIG. 1. shows the filter of the invention pleated into a tube.

Figure 2:
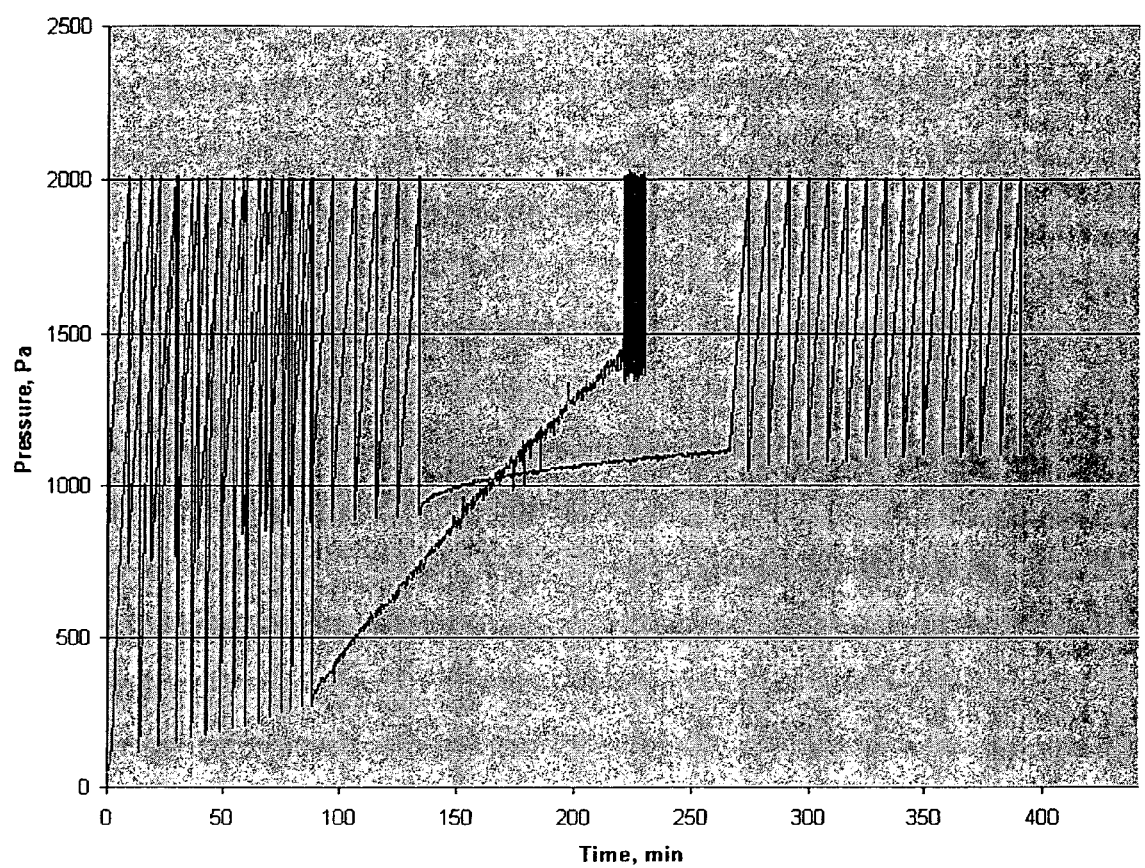

FIG. 2. shows the results of a permeability recovery test comparing the permeability recovery of the inventive filter media with that of a paper media filter alone.

Figure 3:
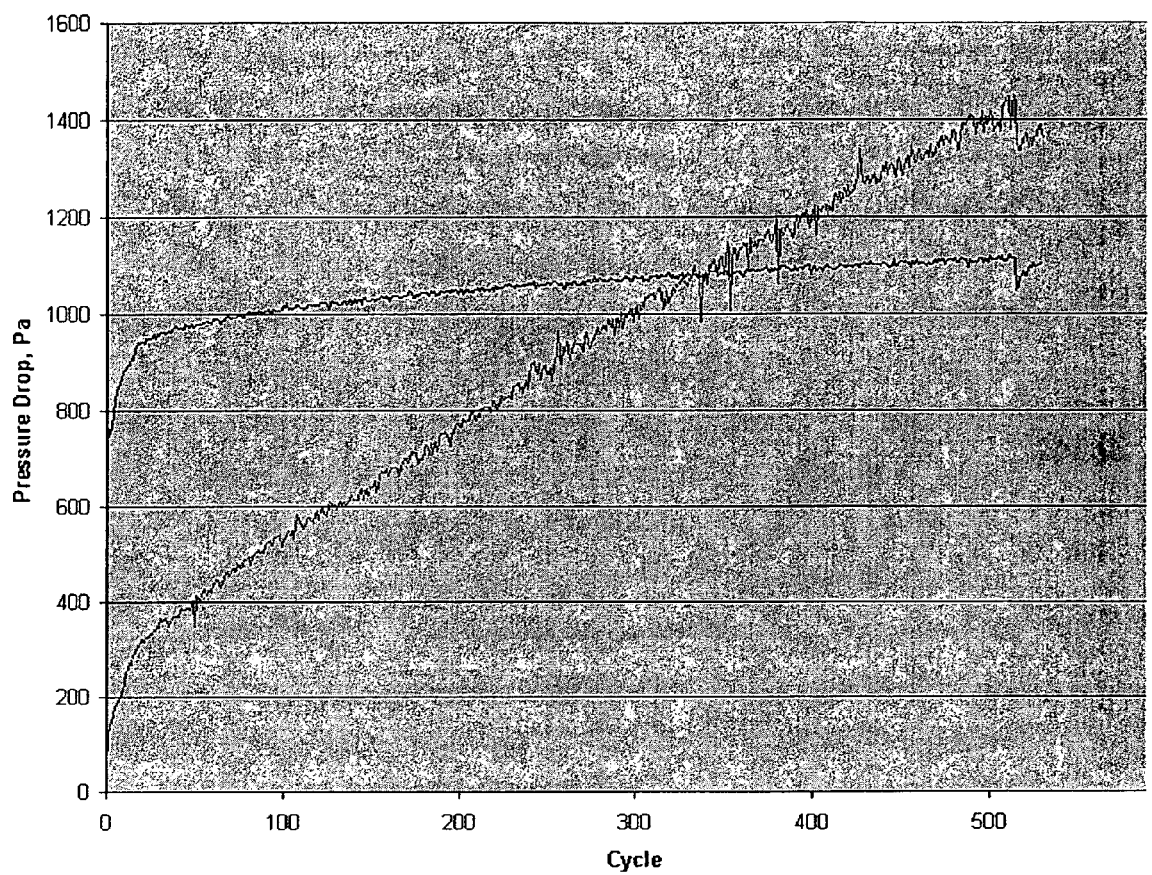

FIG. 3 shows the residual pressure drop across both the filter media of the present invention and the paper filter media alone.

Membrane Material

It is preferred to employ an expanded PTFE filter as the membrane filtration media in the present invention. Expanded PTFE made in accordance with U.S. Pat. Nos. 3,953,566; 3,962,153; 4,096,227; and 4,187,390, all incorporated by reference, is formed by heating and rapidly expanding PTFE in at least one direction. When processed in this manner, the expanded PTFE forms a microscopic structure of polymeric nodes interconnected by fibrils. Space between the nodes and fibrils are micropores that are large enough to allow the passage of air and water vapor, but are too small to permit passage of liquid water or even fine water droplets.

The expanded PTFE filter material that is particularly preferred for use with the present invention comprises an expanded PTFE membrane. The preferred membrane has the following properties: an air permeability of 2 to 120 or more cfm/ft$^2$ at 12.7 mm (0.5 inch) H$_2$O and a filtration efficiency of greater than 50% at 0.3 micrometers. Most preferably, the membrane has an air permeability about 5 to 15 cfm/ft$^2$ at 12.7 mm (0.5 inch) H$_2$O and a filtration efficiency of greater than about 90% at 0.3 micrometers and at a face velocity of 5.3 cm/s.

Cellulose Paper

The filter material is laminated to a cellulose paper backing material having a binding material. The binder is applied during the manufacture of the cellulose paper filter media and helps to improve the strength of the material by bonding the cellulose fibers together. In cellulose paper manufacturing, binders may comprise about 10 percent by weight (10 Wt %) to about 40 Wt % of the filter media. Membrane bonding may be improved by increasing the amount of binder, but too much binder lowers filter material permeability.

Preferably, the binder is a thermoplastic polymer. Suitable thermoplastic polymers include poly vinyl acetate, polyethylene, polypropylene, polystyrene, and polyurethanes. Most preferably, the binder is poly vinyl acetate.

The inventors have discovered that the binder used in the manufacture of the cellulose paper filter media, may be used to laminate the cellulose paper to the membrane filter media without the use of a separate adhesive. If the binder is poly vinyl acetate, for example, using 10 Wt % to 40 Wt % may be effective for filter media. Preferably, the binder comprises about 10 Wt % to about 30 Wt % of the cellulose paper filter media. More preferably, the binder comprises about 18 Wt % to about 25 Wt % of the cellulose paper filter media. Most preferably, the binder comprises about 20 Wt % of the cellulose paper filter media.

The cellulose paper and membrane filtration media are laminated under heat and pressure. The lamination conditions are dependent upon the binder material and concentration used in the cellulose paper filter media and are readily determined by those of skill in the art. Excessive or inadequate heating or pressure can compromise the bond between the cellulose paper and the membrane.

In order to increase exposed surface area of the filter element, the filter material can be folded into multiple pleats and then installed in a "rippled" or "pleated" orientation into the filtration apparatus. The pleated material can be formed into a cylinder or "tube" and the edges bonded together through the use of an adhesive (e.g., hot-melt glue, etc.).

As is shown in FIG. 1, the final laminated filter sheet material 20 is preferably pleated and formed into a tube. Pleats 32 are spaced to provide approximately 0.5 to 5 pleats per cm. To form the filter cartridge 10 from the tube, the tube is mounted with an end plate 22 at one end and a tight gasket element 24 at its opposite end. The end plate 22 and gasket element 24 are ideally provided with channels 26, 28, respectively, into which the filter sheet 20 is mounted. The filter sheet 20 can be held in the channels through any suitable means, including through the use of an adhesive, or a potting compound 30, for example. It is important that the seal between the filter sheet 20 and the end plate 22 and the gasket element 24 are tight so as to avoid leakage therethrough.

The gasket element 24 can be formed from any suitable material that will retain its elastic and conformable properties over time and can provide a snug, air-and liquid-tight seal. A preferred material for the gasket is a urethane, such as GORE BOND I3P3 brand urethane available from W. L. Gore & Associates, Inc., Newark, Del.

It should be understood that the filter elements of the present invention may be constructed in a variety of manners. For instance, the end cap 22 may be constructed from any suitable material such as plastic or metal (preferably non-corrosive metal), for example. Further, it may be possible to employ a filter with no end cap, using instead a gasket element on both sides of the filter. Alternatively, the filter may be used as a pleated panel.

When constructed in the manner disclosed, the filter cartridge 10 has one open end 34 surrounded by the gasket element 24 that is adapted to snugly fit over the suction unit of a vacuum. The precise shape and proportions of the gasket element 24 will vary between different vacuums. Vacuums may have a variety of different mounting mechanisms to secure the filter in place. For example, the gasket element 24 may form a tight fit against a sealing surface on the suction unit. In this embodiment it may be retained in place by friction between the suction unit and the gasket or by other means, such as a mechanical fastener.

The filter employed with the present invention provides excellent particle filtration at all times. The preferred expanded PTFE filter for use in the present invention provides a filtration efficiency of 60 to 99.9%, or more, at 0.3 micrometers at a face velocity of 5.3 cm/s. Ideally, the filter has an efficiency of 99.0 to 99.99 at 0.3 micrometers at a face velocity of 5.3 cm/s.

EXAMPLE

Filter media in accordance with the present invention was constructed from an expanded PTFE membrane, made in accordance with U.S. Pat. No. 3,953,566 to Gore, with the following properties: An air permeability of 9 cfm/ft² at 0.5 inch H₂O and a filtration efficiency of 99.999% at 0.3 micrometers at a face velocity of 5.3 cm/s. This material is commercially available from W. L. Gore and Associates Inc., Newark, Del.

The expanded PTFE membrane material was laminated to a 0.023 inch thick resin impregnated cellulose paper filter media obtained from Hollingsworth and Vose, West Groton, Mass. The cellulose paper media had a basis weight of 115 g/m² and contained approximately 22% by weight poly vinyl acetate binder. The cellulose paper media had an air permeability of 70 cfm/ft² at 0.5 inch H₂O and a filtration efficiency of 13% at 0.3 micrometers and 5.3 cm/s face velocity.

The resulting filter laminate had the following properties: An air permeability of 3.4 cfm/ft² at 0.5 inch H₂O and filtration efficiency of 99.999% at 0.3 micrometers and 5.3 cm/s face velocity The inventive filter was tested and compared with a conventional cellulose paper filter. FIG. 2 shows the results of a permeability recovery test comparing the permeability recovery of the inventive filter media with that of a paper media filter alone. As can be seen from the figure, the inventive media continues to demonstrate permeability recovery after 400 cycles. In contrast, the cellulose paper media shows poor recovery after less than 250 cycles.

The inventive filter not only recovers better, the cleaning cycle time is significantly shorter, as seen in the figure. Table 1 compares the cleaning cycle times of the two media at the initial start-up and after prolonged use. The inventive filter media has significantly longer cleaning cycle times after simulated long term aging effects.

TABLE 1

| | Cellulose Paper Media | Inventive Filter Media |
|---|---|---|
| Average Cycle Time (Initial 15 Cycles) | 370 Seconds | 575 Seconds |
| Average Cycle Time (Final 15 Cycles) | 38 Seconds | 496 Second |

In FIG. 3 the residual pressure drop across both filter media is shown. After about 350 cycles, the inventive media shows steadily increasing improvement over the cellulose paper media.

TEST METHODS

Air Permeability

Air permeability may be measured by clamping a test sample in a gasketed flanged fixture which provided a circular area of approximately 3827 mm² (69.85 mm diameter) (6 square inches (2.75 inches diameter)) for air flow measurement. The upstream side of the sample fixture is connected to a flow meter in line with a source of dry compressed air. The downstream side of the sample fixture is open to the atmosphere. Testing is accomplished by applying a pressure of 12.7 mm (0.5 inch) of water to the upstream side of the sample and recording the flow rate of the air passing through the in-line flowmeter (a ball-float rotameter). The sample is conditioned at 70° F. and 65% relative humidity for at least 4 hours prior to testing. Results are reported in terms of Frazier Number which is air flow in cubic feet/minute/square foot of sample at 12.7 mm (0.5 inch) water pressure.

Particle Collection Efficiency Test

Particle collection efficiency was measured by an automated tester (Model 8160 from TSI, Inc., St. Paul, Minn.). A 6 inch (152.4 mm) diameter flat sheet sample of the filter media was enclosed in the filter holder with gasket seals mounted horizontally. The circular filter holder had two zones, a center test zone which allows air flow and test particles to pass through and an outer guard zone to prevent leakage of air flow between the test zone and the atmosphere. The differential pressure between the two zones was adjusted to near zero so that no outside air leaks into the test zone. The test zone had an area of approximately 100 cm² (11.3 cm diameter) (15 square inch (4.4 inch diameter)). A dioctyl pthalate (DOP) solution was atomized to generate a polydisperse aerosol. The aerosol particles were then classified according to their electrical mobilities to generate monodisperse particles from 0.03 to 0.5 micrometer in diameter. The particles were then passed to the test filter. Two condensation nucleus particle counters simultaneously measured the particle concentrations upstream and downstream of the filter to determine the particle collection efficiency. The efficiency was reported as the percentage of particles collected by the filter relative to the upstream challenge particles. The pressure drop was recorded in mm of water gauge. The test was performed at a media face velocity of 5.3 cm/sec.

The test was performed at ambient room temperature (70° F.) and humidity conditions (40%). Samples to be tested were not conditioned at specific temperature and humidity conditions prior to testing.

Permeability Recovery

The permeability recovery of a filter element is determined using the test method described below (See Also Poon, W. S. "Seasoning test method for cleanable filter media", presented at 12$^{th}$ Annual Technical Conference of the American Filtration & Separation Society, Apr. 6–9, 1999, Boston, Mass. incorporated herein by reference).

The filter media was tested in a test chamber having attached thereto a bed dust generator and pulse-cleaning system. The test chamber measured 101.6 mm by 457.2 mm by 254.0 mm (width×height×depth) and the filter sample (101.6 mm by 457.2 mm, area 0.046 m²) was mounted vertically. The face velocity and air flow rate were 6.1 m/min and 16.8 m³/hr, respectively. A solid aerosol dust generator (Obtained from Topas GmbH, Dresden, Germany) was used to disperse an ISO fine test dust (available from Powder Technologies, Inc., Burnsville, Minn.) to be collected by the filter. The dust belt feed rate was set to 5. The air pressure was 5 bar. The pulse-clean system consisted of a diaphragm valve connected to a compressed-air tank. The tank pressure was set at 2 bar. When the valve opened, the compressed air burst into the clean side of the test chamber, i.e., downstream side of the test filter. The short pulse (50 milliseconds) of air knocked the dust off the filter surface by imparting movement and reversing the air flow momentarily.

During a test cycle, normal operation is first simulated. The filter was loaded with the ISO fine dust until the pressure drop reached 2000 Pa. Cleaning was then triggered and the diaphragm valve was opened to release the compressed air. Immediately after cleaning was completed, the pressure drop of the filter was recorded. This is called the residual pressure drop. After the filter was cleaned, loading began again. The loading and cleaning cycles were repeated 15 times. Next, the cleaning cycle was changed such that the filter was cleaned every 15 seconds. This cleaning cycle was repeated 500 times to simulate long term aging effects.

Finally, the filter was returned to normal operation in which the filter is cleaned when the pressure drop reached 2000 Pa. Thus, the filter was tested in 15 cycles of normal pulse-on-demand cleaning, 500 cycles of pulse-on-time cleaning and 15 cycles pulse-on-demand cycles. The air permeability of the filter after cleaning was calculated from the face velocity and the residual pressure drop for each cycle.

Generally, the pressure drop across the filter media is linearly proportional to the face velocity of the airflow. At 6.1 m/min, the permeability of the sample is related to the residual pressure drop by the following equation:

Permeability, Frazier=10/Residual Pressure, inch of water

The permeability recovery is the ratio of the permeability to the initial permeability. That is, Permeability Recovery, %=(Permeability/Initial Permeability)×100

While particular embodiments of the present invention have been illustrated and described herein, the present invention should not be limited to such illustrations and descriptions. It should be apparent that changes and modifications may be incorporated and embodied as part of the present invention within the scope of the following claims:

We claim:

1. An article consisting essentially of:
  a) a paper layer consisting of cellulose fibers and about 10 Wt % to about 40 Wt % of a thermoplastic binder wherein the binder is polyvinyl acetate, and
  b) a hydrophobic ePTFE membrane laminated to the paper layer.

2. The article of claim 1 in which the paper layer includes about 10 Wt % to about 30 Wt % of the thermoplastic binder.

3. The article of claim 1 in which the paper layer includes about 18 Wt % to about 25 Wt % of the thermoplastic binder.

4. The article of claim 1 in which the paper layer includes about 20 Wt % of the thermoplastic binder.

5. A filter media consisting essentially of:
  a) a cellulose paper layer consisting of cellulose fibers and about 20 Wt % poly vinyl acetate binder, the cellulose paper layer having an upstream side and a downstream side relative to the direction of airflow; and
  b) a hydrophobic ePTFE membrane laminated to the upstream side of said cellulose paper layer.

6. A method of making a filter media consisting essentially at
  a) providing a cellulose paper layer consisting essentially of cellulose fibers and about 20 Wt % of poly vinyl acetate binder,
  b) providing a hydrophobic ePTFE membrane to at least one surface of the cellulose paper layer; and
  c) laminating the ePTFE membrane to the cellulose paper layer such that the ePTFE membrane adheres to the cellulose paper layer by melting at least a portion of the poly vinyl acetate binder.

* * * * *